United States Patent [19]

Peters

[11] Patent Number: 5,594,170
[45] Date of Patent: Jan. 14, 1997

[54] $K_{IP}$ CANCELLATION IN A PENDULOUS SILICON ACCELEROMETER

[75] Inventor: Rex B. Peters, Woodinville, Wash.

[73] Assignee: AlliedSignal Inc., Redmond, Wash.

[21] Appl. No.: 558,049

[22] Filed: Nov. 13, 1995

Related U.S. Application Data

[63] Continuation of Ser. No. 260,140, Jun. 15, 1994, abandoned.

[51] Int. Cl.[6] .......................... G01P 15/10; G01P 15/00
[52] U.S. Cl. ....................... 73/514.29; 73/514.36
[58] Field of Search ........................... 73/514.29, 514.36, 73/497, DIG. 1, 862.59, 514.23

[56] References Cited

U.S. PATENT DOCUMENTS

| | | | |
|---|---|---|---|
| 4,372,173 | 2/1983 | Eernisse et al. | 73/862.59 |
| 4,517,841 | 5/1985 | Peters et al. | 73/517 AV |
| 4,718,275 | 1/1988 | Norling | 73/497 |
| 4,750,363 | 6/1988 | Norling | 73/517 AV |
| 4,766,768 | 8/1988 | Norling et al. | 73/497 |
| 4,785,215 | 11/1988 | Blech | 310/329 |
| 4,872,343 | 10/1989 | Peters et al. | 73/517 AV |
| 4,879,914 | 11/1989 | Norling | 73/862.59 |
| 4,891,982 | 1/1990 | Norling | 73/497 |
| 4,926,689 | 5/1990 | Hanson | 73/517 AV |
| 4,939,935 | 7/1990 | Amand | 73/517 AV |
| 4,944,184 | 7/1990 | Blake et al. | 73/514 |
| 4,980,598 | 12/1990 | Albert | 310/321 |
| 5,005,413 | 4/1991 | Novack et al. | 73/517 AV |
| 5,095,749 | 3/1992 | Hanson | 73/497 |
| 5,165,279 | 11/1992 | Norling et al. | 73/517 AV |
| 5,176,031 | 1/1993 | Peters | 73/516 R |
| 5,287,744 | 2/1994 | Norling et al. | 73/497 |
| 5,375,469 | 12/1994 | Levy et al. | 73/517 B |
| 5,456,110 | 10/1995 | Hulsing, II | 73/514.38 |

*Primary Examiner*—Thomas P. Noland
*Assistant Examiner*—Richard A. Moller
*Attorney, Agent, or Firm*—Fitch, Even, Tabin & Flannery

[57] ABSTRACT

An accelerometer, preferably made by silicon micromachining, includes a proof mass or pendulum connected to an isolator with a pair of flexures defining a hinge axis HA. The flexures enable the pendulum to rotate about the hinge axis HA relative to the isolator. In order to constrain movement of the pendulum, a pair of resonators are coupled between the pendulum and the isolator. The isolator is connected to a support by way of a pair of flexures which increases the compliance of the connection between the isolator and the support. The flexures connected between the isolator and the support have a relatively smaller cross section than the isolator and the support and, thus, reduce the transmission of stresses across the flexures. In addition, as the flexures become more compliant, the isolator deflects under acceleration which counteracts the deflection of the proof mass which results in the cross coupling error. By properly selecting the stiffness for the flexures used to connect the support and the isolator, cross coupling error can essentially be eliminated.

10 Claims, 9 Drawing Sheets

Fig. 1

PRIOR ART

Fig. 2

PRIOR ART

Fig. 3

PRIOR ART

Fig. 7  d = 0  b₁ = 1.0 (NO DAMPING)

Fig. 8  d = 0  b₁ = 1.0 (NO DAMPING, 10% MISMATCH IN COMPLIANCE)

Fig. 9  d = 0.167   b₁ = 1.0   Q = 3
(NO ISOLATOR DAMPING)

Fig. 10  d = 0   b₁ = 1.2   Q = 3
(ISOLATOR DAMPING = 20% OF TOTAL)

Fig. 11  d = 0.5    b₁ = 1.2    Q = 1
(ISOLATOR DAMPING 20% OF TOTAL)

Fig. 12  d = 0.167    b₁ = 1.2    Q = 3
(ISOLATOR DAMPING 20% OF TOTAL,
10% MISMATCH IN COMPLIANCE)

Fig. 13 d = 0.5  b₁ = 1.2  Q = 1
(ISOLATOR DAMPING 20% OF TOTAL, 10% MISMATCH IN COMPLIANCE)

Fig. 14 d = 0  b₁ = 1.0
(NO ISOLATOR COMPLIANCE, NO DAMPING)

Fig. 15  d = 0.167  b₁ = 1.0  Q = 3
(NO ISOLATOR COMPLIANCE)

Fig. 16  PERFECT MODEL

Fig. 17  PERFECT MODEL

$K_{IP}$ CANCELLATION IN A PENDULOUS SILICON ACCELEROMETER

This application is a continuation of application Ser. No. 08/260,140 filed Jun. 15, 1994, now abandoned.

BACKGROUND OF THE INVENTION

1. Field of the Invention

The present invention relates to an accelerometer and, more particularly, to a pendulous accelerometer that includes a pendulum or proof mass coupled to an isolator by way of a plurality of flexures and resonators; the isolator, in turn, coupled to a support by way of a plurality of flexures in order to reduce cross coupling errors in the accelerometer output which result from the cross axis sensitivity of the pendulum.

2. Description of the Prior Art

Figure 1:
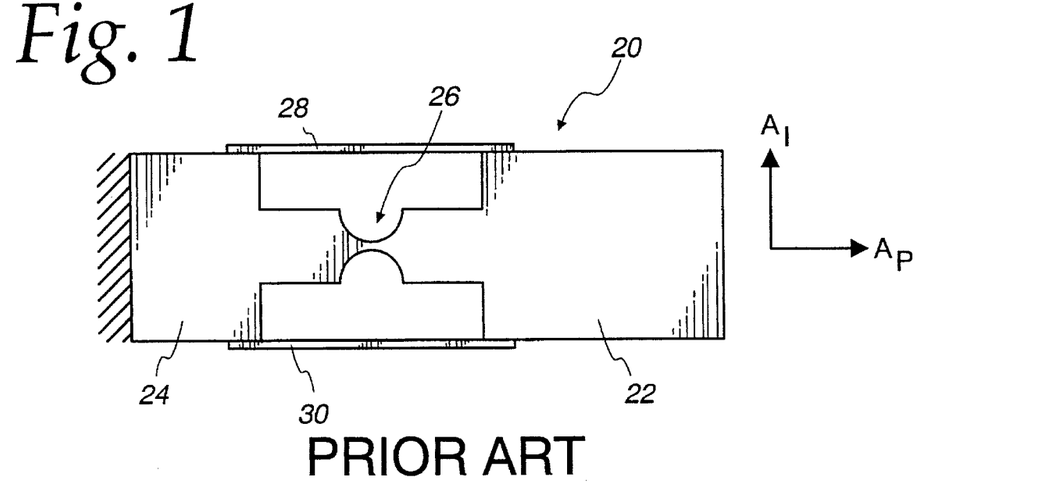
FIG. 1 is a simplified representation of a known pendulous accelerometer.

Pendulous accelerometers are generally known in the art. Examples of such accelerometers are disclosed in U.S. Pat. Nos. 5,005,413 and 5,287,744, hereby incorporated by reference. Such pendulous accelerometers, particularly openlooped pendulous accelerometers with finite elastic compliance, are subject to cross coupling errors resulting from the cross axis sensitivity of the pendulum. This cross coupling error is best understood with reference to FIG. 1 which illustrates a pendulous accelerometer 20 which includes a proof mass or pendulum 22 coupled to a fixed support 24 by way of a flexure 26. The flexure 26 enables the pendulum 22 to rotate about a hinge axis HA; perpendicular to the plane of the page. Movement of the proof mass 22 is constrained by way of a pair of resonators 28 and 30, for example, double-ended tuning forks (DETFs). With such a configuration, accelerations applied along the positive input axis $a_I$ cause the proof mass 22 to deflect downwardly which, in turn, causes tension and compression forces in the resonators 28 and 30, respectively. The deflection of the proof mass 22 resulting from an acceleration applied along the input axis $a_I$ thus changes the direction of the input axis $a_I$ and, hence, causes a proportional sensitivity to acceleration applied along a pendulous axis $a_P$, generally normal to the input axis $a_I$. More particularly, the downward deflection of the proof mass 22 resulting from accelerations applied along the input axis $a_I$ enables accelerations or components along the pendulous axis $a_P$ to produce a torque which rotates the proof mass 22 down further, thus increasing the forces applied to the resonators 28 and 30. As such, the cross axis sensitivity of the proof mass introduces an error term in the accelerometer 20 output given by equation 1 below.

$$E = K_{ip} * a_I * a_P, \quad (1)$$

where $K_{ip}$ is a cross coupling error coefficient; a positive constant for the conditions described above; $a_I$=acceleration relative to the input axis $a_I$ and $a_P$=acceleration relative to the pendulous axis $a_P$.

Figure 2:
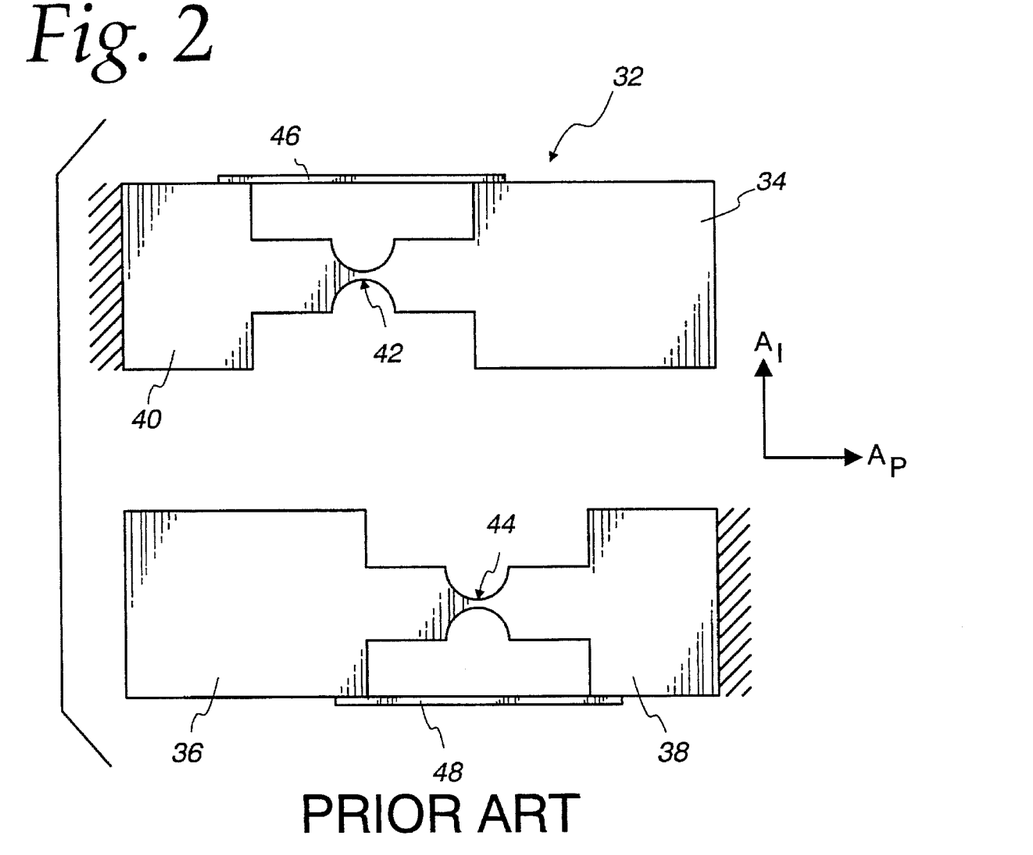
FIG. 2 is a simplified representation of another known pendulous accelerometer which includes dual pendulums for cross coupling error compensation.
Figure 3:
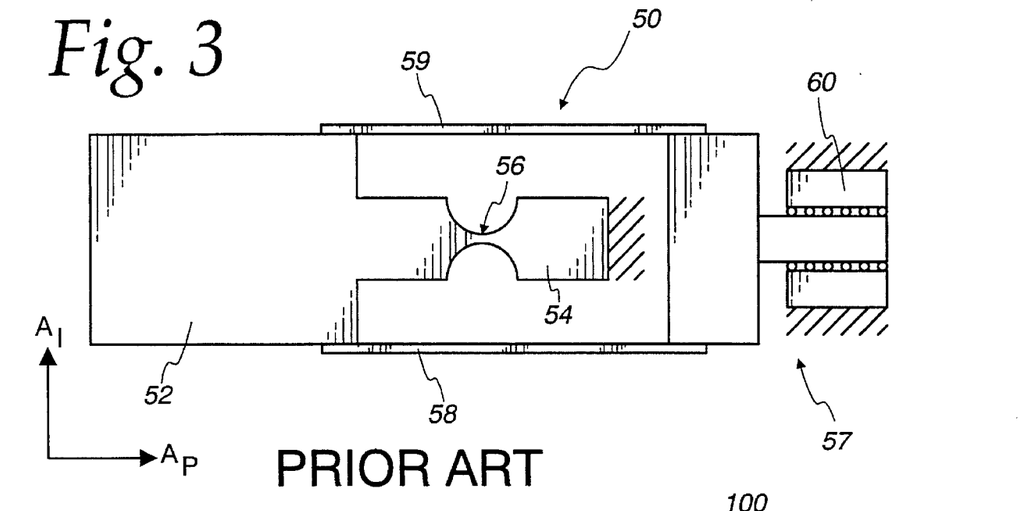
FIG. 3 is a simplified representation of another known pendulous accelerometer which includes a single pendulum and a thermal isolator which provides compensation for cross coupling errors.
Figure 4:
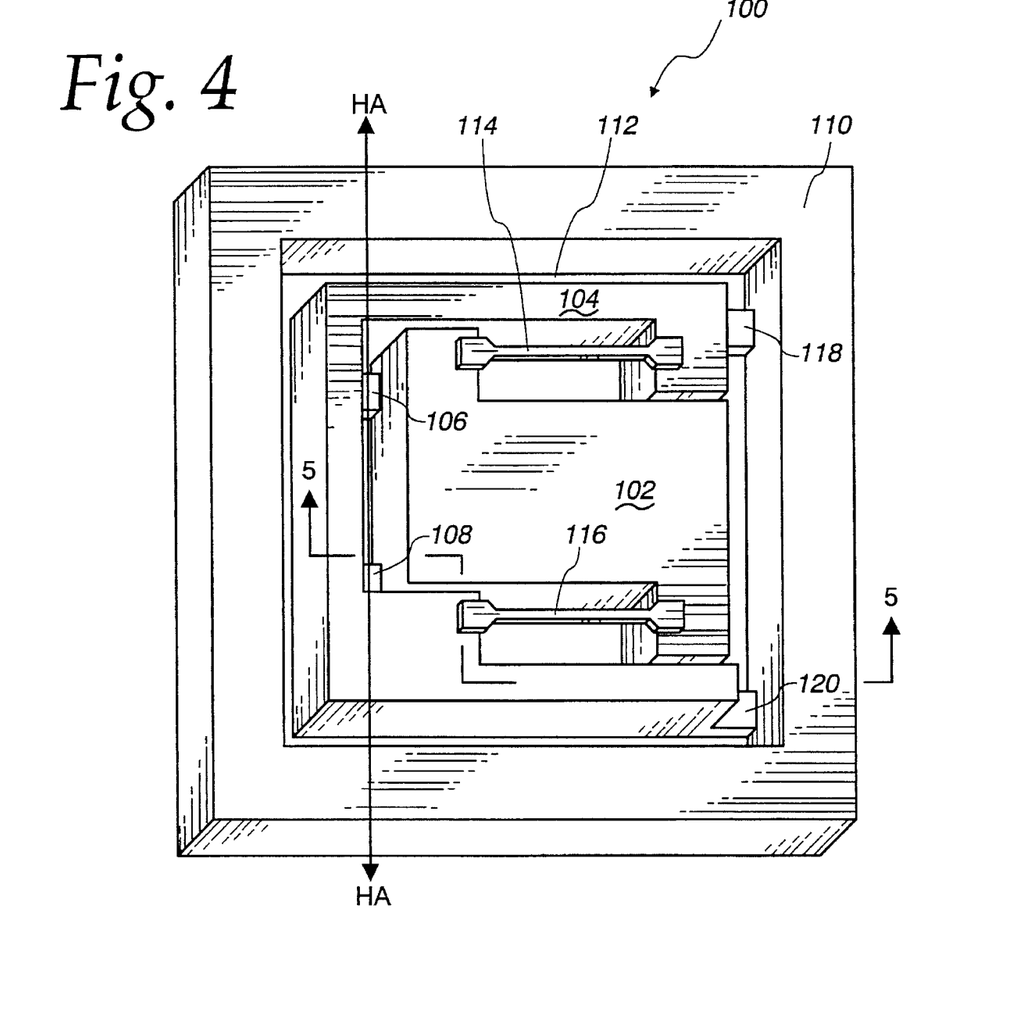
FIG. 4 is a perspective view of an accelerometer in accordance with the present invention.

This cross coupling error is undesirable because it can produce static errors comparable to bias errors in an inertial grade accelerometer and because synchronous vibration along the input and pendulous axis $a_I$ and $a_P$, simultaneously will rectify to produce a dc error without a dc input. As such, various attempts have been made to compensate for such cross coupling errors, as illustrated in FIGS. 2–4. FIG. 2 illustrates a known accelerometer 32 which includes a pair of proof masses 34 and 36, connected to supports 38 and 40 by way of flexures 42 and 44, respectively. Each proof mass 34, 36 is connected to its respective support 38, 40 by way of a resonator 46 or 48. With the configuration as shown, the pendulum 36 produces a cross coupling error which is of opposite sign of the cross coupling error produced by the pendulum 34 when the outputs of the resonators 46 and 48 are combined in such a way to cause the responses to an acceleration along the input axis $a_I$ to reinforce. However, in order for the cross coupling errors to cancel completely, the pendulums 34, 36 must be matched for natural frequency and damping which increases the fabrication cost and space requirements. In addition, the embodiment illustrated in FIG. 2 is relatively large and heavy and requires two precision flexures.

FIG. 3 illustrates another known accelerometer 50 that is relatively smaller and less complex than the accelerometer 20 which also includes means for compensating the cross coupling error. The accelerometer 50 includes a pendulum or proof mass 52 coupled to a fixed support 54 by way of a flexure 56. Rotation of the proof mass 52 is constrained by way of a pair of resonators 58 and 59. Since the resonators 58 and 59 are made from different material than the pendulum 52, the resonators 58 and 59 are coupled to a thermal isolator 57 to compensate for thermal stresses. The thermal isolator 57, in turn, is coupled to a support 60 and configured to be highly compliant for translation parallel to the pendulous axis $a_P$ but stiff for rotation about an axis generally parallel to the hinge axis (i.e., an axis perpendicular to the plane of the page) to relieve thermal stress. The isolator 57 is positioned such that accelerations parallel to the pendulous axis $a_P$ places both the resonators 58 and 59 in either tension or compression at the same time, while accelerations applied along the input axis $a_I$ puts one resonator 58 or 59 in tension and the other in compression. Since the output of the resonators 58 or 59 is known to be nonlinear, these sensitivities can be tuned to produce a pseudo-$K_{ip}$ which cancels the cross coupling error coefficient $K_{ip}$.

However, there are several drawbacks with the accelerometer 50. First, the cross coupling error coefficient $K_{ip}$ is dependent upon a comparatively large nonlinear coefficient $K_{ii}$, inherent in the resonators. Since the coefficient $K_{ii}$ can be affected by the data processing, the configuration can only provide acceptable results as long as the mechanical designer controls both the sensor design and the data processing. A second drawback of the accelerometer 50 is that it uses resonators 58 and 59 on the top and bottom of the pendulum 52; contrary to the current trend in silicon sensor fabrication in which both of the resonators are formed in one plane for easier fabrication and to obviate the need to depend on two matched epitaxial layers. Lastly, the thermal isolator 57 is basically unnecessary in monolithic silicon designs since the structure is made of an essentially homogeneous material, for example, as disclosed in U.S. Pat. No. 5,005,413.

SUMMARY OF THE INVENTION

It is an object of the present invention to provide a pendulous accelerometer which compensates for cross coupling errors resulting from the cross axis sensitivity of the pendulum that is relatively simple and inexpensive to fabricate.

It is yet a further object of the present invention to provide a silicon micromachined accelerometer with cross coupling error compensation.

Briefly, the present invention relates an accelerometer, which may be made by silicon micromachining, which includes a proof mass or pendulum connected to an isolator with a pair of flexures defining a hinge axis HA. The flexures enable the pendulum to rotate about the hinge axis HA relative to the isolator. In order to constrain movement of the pendulum, a pair of resonators are coupled between the pendulum and the isolator. The isolator is connected to a support by way of a pair of flexures which increases the compliance of the connection between the isolator and the support. The flexures connected between the isolator and the support have a relatively smaller cross section than the isolator and the support and, thus, reduce the transmission of stresses across the flexures. In addition, as the isolator flexures become more compliant, the isolator deflects under acceleration which counteracts the deflection of the proof mass which results in the cross coupling error. By properly selecting the stiffness for the flexures used to connect the support and the isolator, cross coupling error can essentially be eliminated.

DESCRIPTION OF THE DRAWINGS

These and other objects of the present invention will be readily understood by the following description and attached drawings wherein.

DETAILED DESCRIPTION OF THE EMBODIMENT

Figure 5:
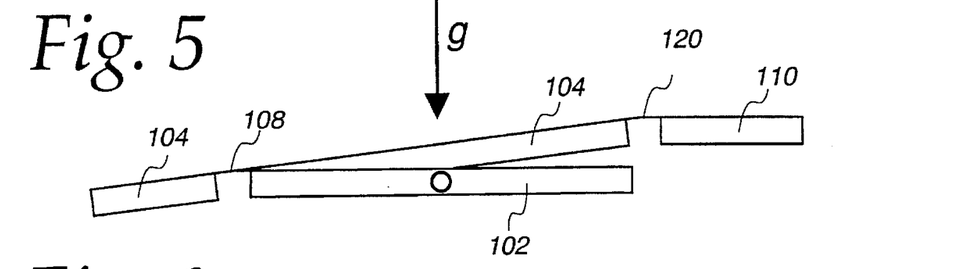
FIG. 5 is a section view along lines 5—5 of FIG. 4.

The present invention relates to a pendulous accelerometer, illustrated in FIGS. 4 and 5, which includes an isolator for isolating the pendulum from thermal and mechanical mounting stresses. An important aspect of the invention relates to the compliance of the isolator which provides compensation for cross coupling errors due to cross axis sensitivity of the pendulum.

The accelerometer, generally identified with the reference numeral 100, includes a pendulum or proof mass 102. The pendulum 102 is coupled on one end to an isolator 104 by way of a pair of flexures 106 and 108 which define a hinge axis HA. The flexures 106, 108 enable the proof mass 102 to rotate relative to the isolator 104 about the hinge axis HA. The accelerometer 100 further includes a mounting base 110 which enables the accelerometer 100 to be mounted to a device whose acceleration is to be detected. External stress is reduced because the mounting base 110 is only attached to the isolator 104 at two points that are relatively small in cross section and physically remote from the flexures 106 and 108.

The isolator 104 is formed by way of a slot 112 disposed around the flexures 106 and 108, and a portion of the pendulum 102, as discussed in more detail in U.S. Pat. No. 5,287,744, assigned to the same Assignee as the Assignee of the present invention and hereby incorporated by reference. The isolator 104 isolates the pendulum 102 from both thermal and mounting stresses, which can be relatively large and unpredictable.

In order to constrain the motion of the pendulum 102, a pair of resonators 114 and 116 are coupled between the isolator 104 and the pendulum 102. More particularly, the resonator 114 is connected at one end to the pendulum 102 and extends in one direction along an axis generally perpendicular to the hinge axis HA to its point of connection to the isolator 104. The resonator 116 is connected at one end to the pendulum 102 and extends in an opposite direction along an axis generally perpendicular to the hinge axis HA. This arrangement results in a push-pull operation where for a given direction of acceleration one of resonators 114 or 116 be subject to a tension force while the other resonator 114 or 116 will be subject to a compression force.

The resonators 114 and 116, illustrated as double-ended tuning forks (DETFs), include a pair of vibrating beams which are forced to oscillate in the plane of the beams 180° out-of-phase with one another. The resonators 114, 116 are disposed generally normal to the hinge axis HA and formed in a common plane adjacent one side of the accelerometer 100 discussed in detail in U.S. Pat. No. 5,005,413, incorporated by reference. As shown, the resonators 114 and 116 are disposed adjacent a top side of the accelerometer 100 while the flexures 106 and 108 are formed on a bottom side of the accelerometer 100.

In accordance with an important aspect of the invention, flexures 118 and 120 are provided between the isolator 104 and the mounting base 110. The flexures 118 and 120 control the compliance of the isolator 104 such that the center of mass of the pendulum 102 and the flexures 106 and 108 remain in a plane which translates with little or no rotation, as shown in FIG. 5. By providing the flexures 118 and 120, the cross section of the attachment between the isolator 104 and the mounting base 110 is further reduced which results in a further reduction of the transmission of stress across this connection. In addition, as the flexures 118 and 120 become more compliant, the isolator 104 deflects under acceleration, as shown in FIG. 5. This deflection counteracts the rotation of the pendulum 102 which causes the cross coupling error. By carefully selecting the stiffness for the flexures 118 and 120, the cross coupling error can be forced to cancel.

Figure 6:
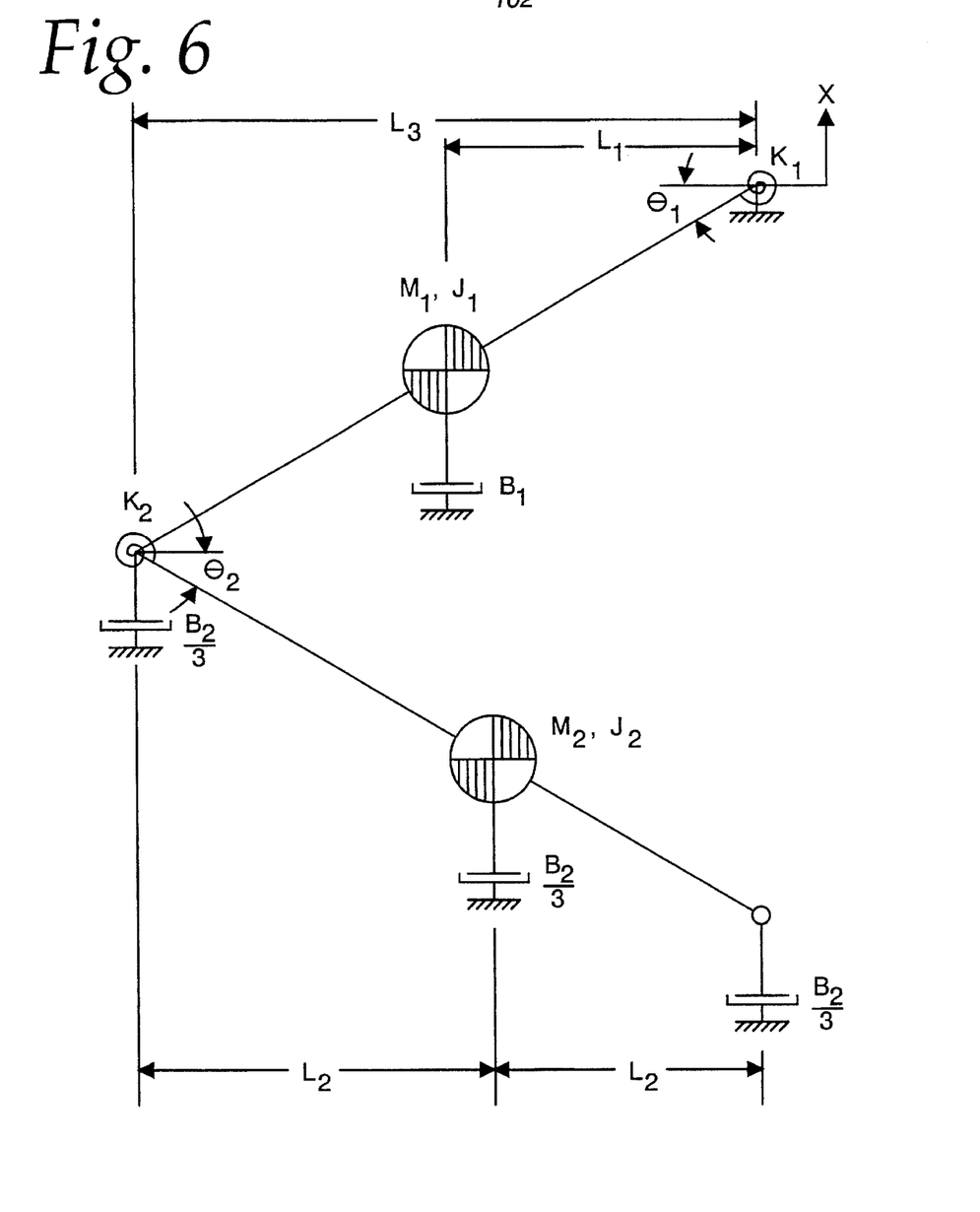
FIG. 6 is a mechanical schematic representation of the accelerometer illustrated in FIG. 4.

The accelerometer 100 may be represented by the mechanical model illustrated in FIG. 6, where $M_1$ and $J_1$ represent the mass and moment of inertia of the isolator 104: $L_1$ represents the position of the center of mass of the isolator 104: $L_3$ represents the length of the isolator 104 and $K_1$ and $K_2$ represent the stiffnesses of the hinge points of the accelerometer 100. In particular, $K_1$ represents the flexural stiffness of the isolator flexures 118 and 120; $K_2$ represents the flexural stiffness of the pendulum flexures 108 and 106, plus the stiffness of the resonators 114 and 116. The angle $\theta_1$ is the rotation angle of the isolator 104, while the angle $\theta_2$ represents the rotation angle of the pendulum 102. The sum of these angles $\theta_1$ plus $\theta_2$ is the rotation angle of the flexures 118, 120 and 106, 108, and represents the output of the accelerometer 100. $M_2$ and $J_2$ represent the mass and moment of inertial of the pendulum 102. The center of the mass of the pendulum 102 is identified as $L_2$. The damping of the isolator 104 due to squeeze film gas effects is represented by $B_1$, while the squeeze film damping of the pendulum 102 is represented as $B_2$. The squeeze film damping of the pendulum 102 is shown distributed along the pendulum 102 to account for the fact that the pendulum 102 can both translate and rotate.

The transfer function for the mechanical model illustrated in FIG. 6, is given by equations 2 through 4. The transfer function is written in condensed form and includes a numerator split into two terms $N_1$ and $N_2$, and a denominator D. The numerator $N_1$ is that part of the numerator due to the isolator angle $\theta_1$. The numerator $N_2$ is that part of the numerator which is due to the pendulum angle $\theta_2$. The variables $Q_1$ through $Q_8$ are defined in equations 5 through 12. The constant $G_L$ is defined in equation 13, while the expression $\omega_n^2$ is defined in equation 14. Equation 15 relates to the cross coupling error coefficient $K_{ip}$ while equations 16 and 17 represent the amplitude and phase response of the accelerometer modeled in FIG. 6 as a function of frequency.

As noted from equation 15, the coefficient of the cross coupling error $K_{ip}$ is affected only by the numerator $N_2$ and the denominator D of the transfer function, whereas the amplitude and phase response of the accelerometer output is dependent upon the sum of the numerators $N_1$ plus $N_2$, as well denominator D as illustrated in equations 16 and 17.

$$N_1 = Q_4[Q_1 S^2 + \omega_n^2 + Q_6 S] - Q_5[S^2 + \omega_n^2 + Q_7 S] \tag{2}$$

$$N_2 = Q_5[Q_1 S^2 + \omega_n^2 + Q_6 S] - Q_4 Q_3[Q_2 S^2 + \omega_n^2 + Q_8 S] \tag{3}$$

$$D = [Q_1 S^2 + \omega_n^2 + Q_6 S]^2 - Q_3[Q_2 S^2 + \omega_n^2 + Q_8 S] * [S^2 + \omega_n^2 + Q_7 S] \tag{4}$$

where:

$$Q_1 = \left[ \frac{M_2 L_2 L_3}{J_2 + M_2 L_2^2} \right] \tag{5}$$

$$Q_2 = \left[ \frac{J_1 + M_1 L_1^2 + M_2 L_3^2}{J_2 + M_2 L_2^2} \right] * \left[ \frac{K_2}{K_1 + K_2} \right] \tag{6}$$

$$Q_3 = \left[ \frac{K_1 + K_2}{K_2} \right] \tag{7}$$

$$Q_4 = \left[ \frac{M_2 L_2 g_L}{J_2 + M_2 L_2^2} \right] \tag{8}$$

$$Q_5 = \left[ \frac{(M_1 L_1 + M_2 L_3) g_L}{J_2 + M_2 L_2^2} \right] \tag{9}$$

$$Q_6 = \left[ \frac{B_2 L_2 L_3}{J_2 + M_2 L_2^2} \right] \tag{10}$$

$$Q_7 = \left[ \frac{(5/3) B_2 L_2^2}{J_2 + M_2 L_2^2} \right] \tag{11}$$

$$Q_8 = \left[ \frac{B_1 L_1^2 + B_2 L_3^2}{J_2 + M_2 L_2^2} \right] \tag{12}$$

$$g_L = 386 \text{ in/s}^2/\text{g} \tag{13}$$

$$\omega_n^2 = \left[ \frac{K_2}{J_2 + M_2 L_2^2} \right] \tag{14}$$

$$K_{ip} = 10^6 \cdot \text{Real} \left[ \frac{N_2}{D} \right] \tag{15}$$

$$\text{Amplitude} = \left[ \frac{N_1 + N_2}{D} \right] \cdot \left[ \frac{\omega_n^2}{Q_4} \right] \tag{16}$$

$$\text{Phase} = \arg \left[ \frac{N_1 + N_2}{D} \right] \cdot \left[ \frac{180}{\pi} \right] \tag{17}$$

FIGS. 7 through 15 illustrate the cross coupling error co-efficient $K_{ip}$ as a function of frequency for various cases to demonstrate the affect of various process variables and mechanical Qs on the cross coupling error $K_{ip}$ for the accelerometer 100 as represented by the mechanical model illustrated in FIG. 6. The value of the cross coupling error coefficient $K_{ip}$ was determined over a frequency range between 0 and 10,000 Hertz by way of equation (18) below.

$$K_{ip,i} = 10^6 * Re \left[ \frac{N_{2,i}}{D_i} \right] \tag{18}$$

for i=0 to 99. The terms $N_{2,i}$ and $D_i$ are defined by equations 19 and 20 below.

$$N_{2,i} = Q_5 * [Q_1 * [S_i]^2 + \omega_n^2 + Q_6 * S_i] - Q_4 * Q_3 * [Q_2[S_i]^2 + \omega_n^2 + Q_8 * S_i] \tag{19}$$

$$D_i = Q_i^* [Q_1^* [S_i]^2 + \omega_n^2 + Q_6^* S_i]^2 - Q_3^* [Q_2^* [S_i]^2 + \omega_n^2 + Q_8^* S_i] * [[S_i]^2 + \omega_n^2 + Q_7^* S_i] \quad (20)$$

where $S_i=6.28j * f_i$ and $f_i=100 * i$. Values for the coefficients $Q_1$ through $Q_5$, as well as $\omega_n$, were selected as identified in Table 1.

TABLE 1

| | |
|---|---|
| $Q_1$ | 1.2 |
| $Q_2$ | 1.2 |
| $Q_3$ | 2.5 (2.25, FIG. 8 only) |
| $Q_4$ | 5800 |
| $Q_5$ | 14,500 |
| $\omega_n$ | 25,000 |

Values of the coefficients $Q_6$, $Q_7$ and $Q_8$ were selected as a function of two variables d and $b_1$, as indicated in equations 21 through 23 to enable the frequency response to be analyzed for the different cases indicated below.

$$Q_6 = 33333 * d \quad (21)$$

$$Q_7 = 83333 * d \quad (22)$$

$$Q_8 = 53333 * d * b_1 \quad (23)$$

Figure 7:
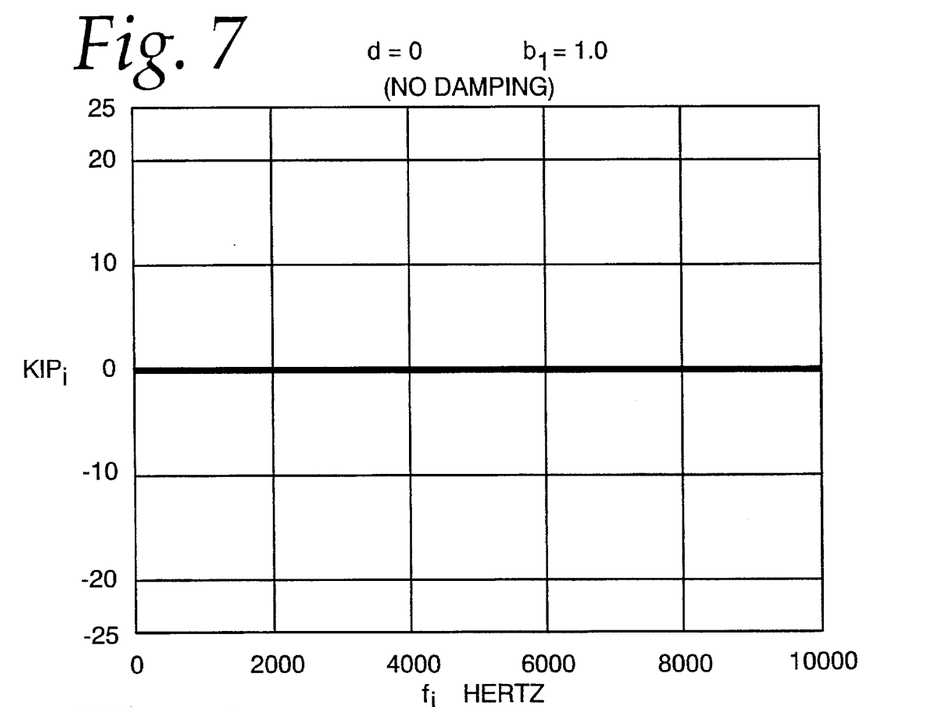
FIG. 7 is a graphical representation of the cross-coupling error coefficient of the accelerometer in accordance with the invention as a function of frequency with no damping.

In FIG. 7, d is set at zero and $b_1$ as 1.0. This frequency response is representative of an ideal case of perfectly matched compliances with no damping; useful in certain mechanisms that require operation in a vacuum. In this case, the two possible degrees of freedom in the mechanism are exactly coincident and combined to produce a perfectly flat response with no cross coupling error at all.

Figure 8:
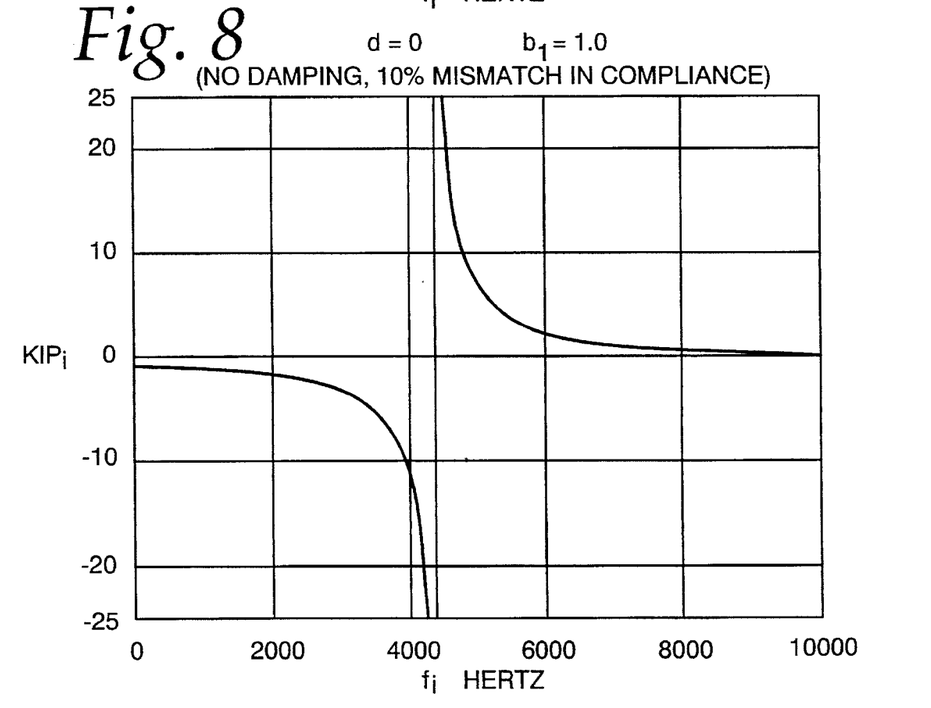
FIG. 8 is a graphical representation of the cross-coupling error coefficient of the accelerometer in accordance with the invention as a function of frequency with a 10% mismatch between the compliances of the pendulum and isolator flexures.

FIG. 8 illustrates a relatively more realistic case where the compliances of the pendulum flexures 106, 108 and the isolator flexures 118, 120 are mismatched by approximately 10%. In this case, cancellation of the cross coupling is no longer perfect. However, it is quite usable except for a relatively narrow band of frequencies near resonance. In an undamped accelerometer, this band of frequencies near resonance is normally avoided anyway.

Figure 9:
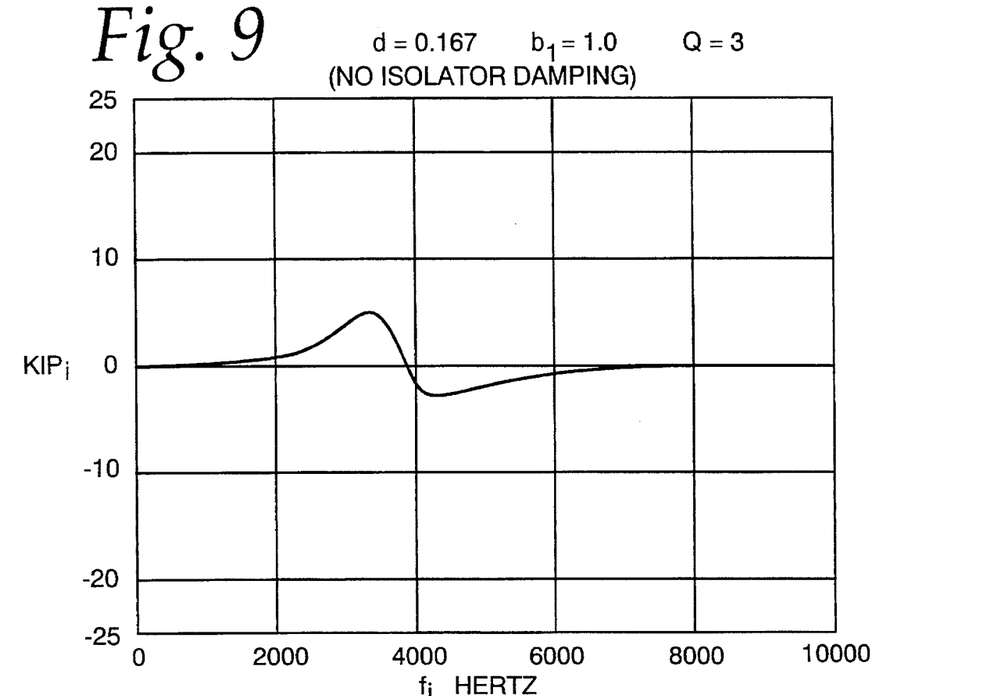
FIG. 9 is a graphical representation of the cross-coupling error coefficient of the accelerometer in accordance with the invention as a function of frequency with no isolator damping and a mechanical Q of 3.
Figure 10:
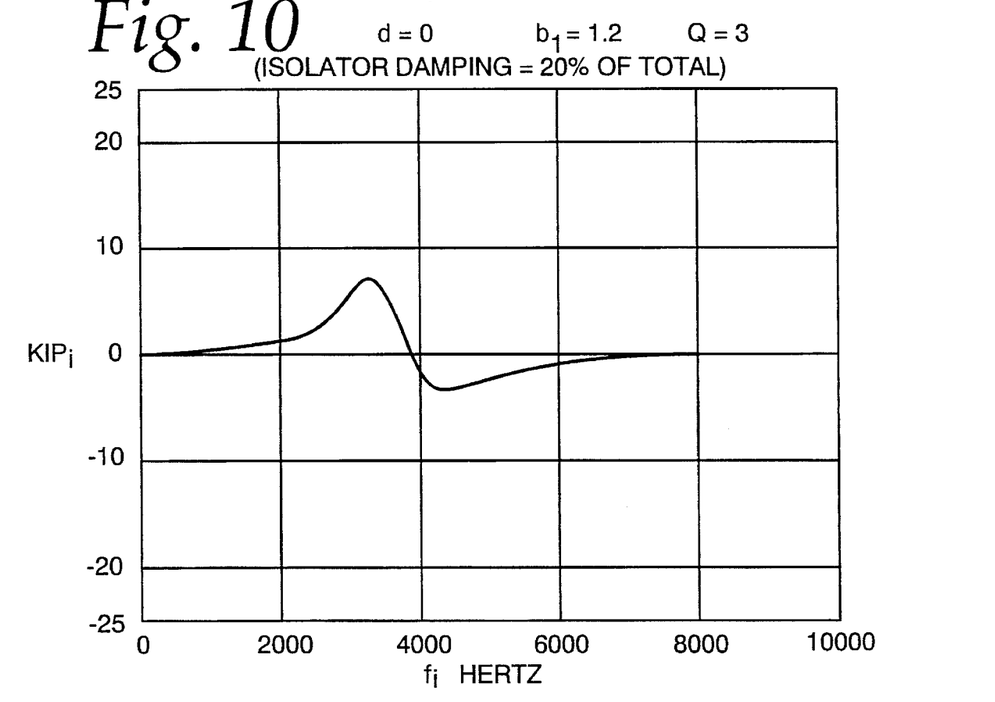
FIG. 10 is a graphical representation of the cross-coupling error coefficient of the accelerometer in accordance with the invention as a function of frequency with the isolator damping at 20% of the total damping and a mechanical Q of 3.
Figure 11:
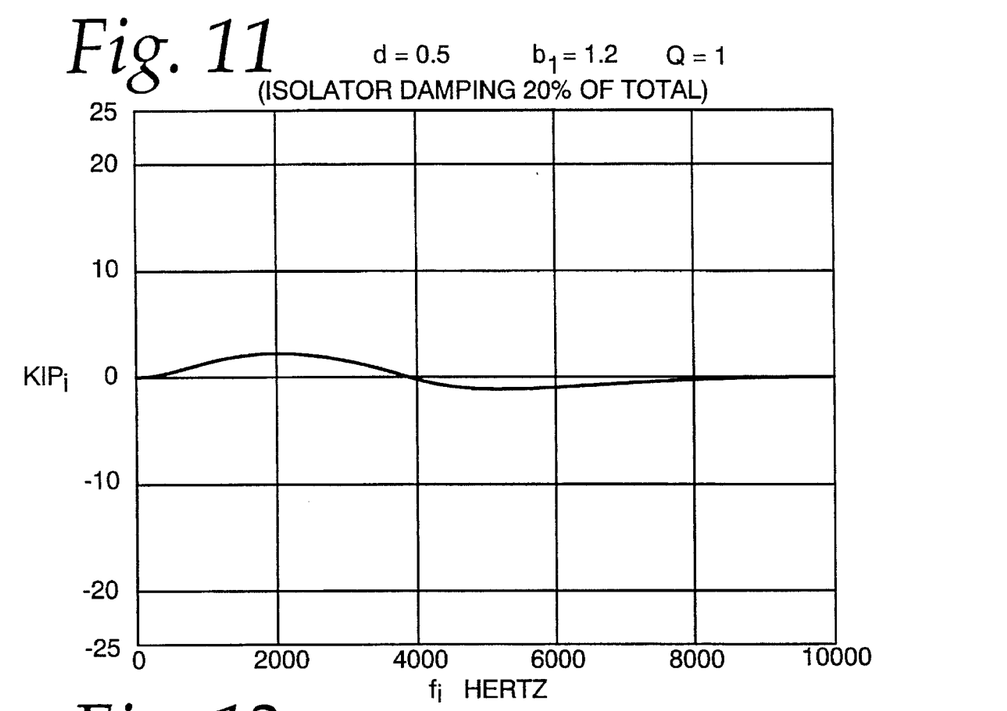
FIG. 11 is a graphical representation of the cross-coupling error coefficient of the accelerometer in accordance with the invention as a function of frequency with the isolator damping at 20% of the total and a mechanical Q of 1.

FIG. 9 illustrates an application and the effects of squeeze film gas damping. In this application, the compensation is still relatively good at low frequencies and usable fairly close to resonance. FIG. 10 shows that the damping force applied to the mounting base 110 by way of its being connected to the pendulum 102 at one edge is large enough such that it hardly matters if the isolator 104 is damped or not. With larger nominal damping, the compensated error begins rising at lower frequency but FIG. 11 shows that the correction is still useful even through the resonant frequencies.

Figure 12:
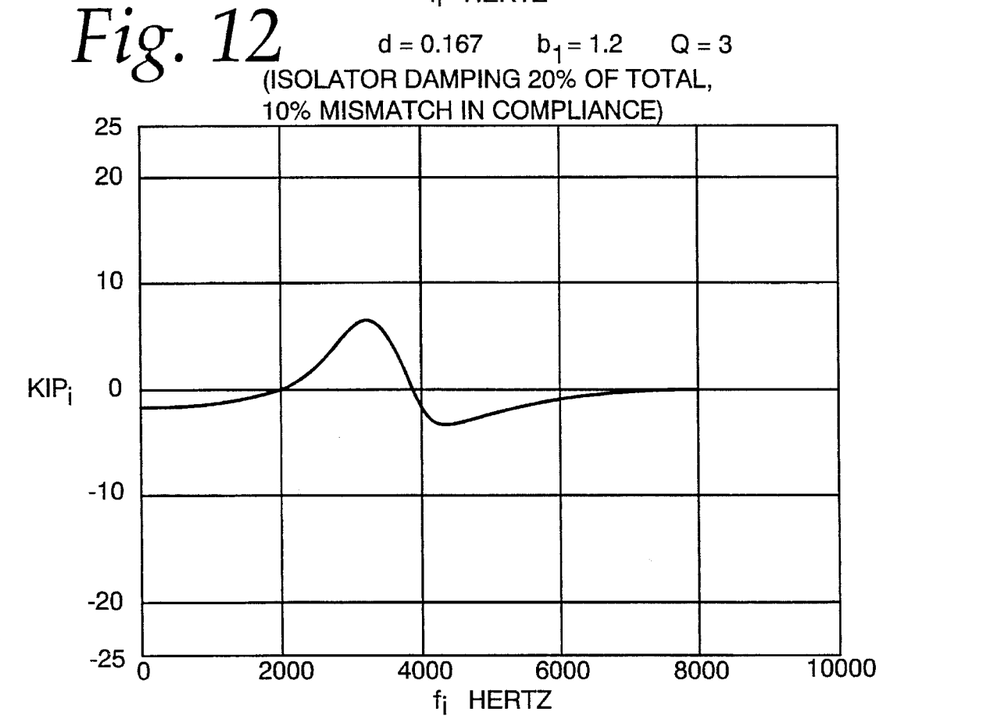
FIG. 12 is a graphical representation of the cross-coupling error coefficient of the accelerometer in accordance with the invention as a function of frequency with a 10% mismatch between the compliances of the pendulum and isolator flexures and the isolator damping at 20% and a mechanical Q of 3.
Figure 13:
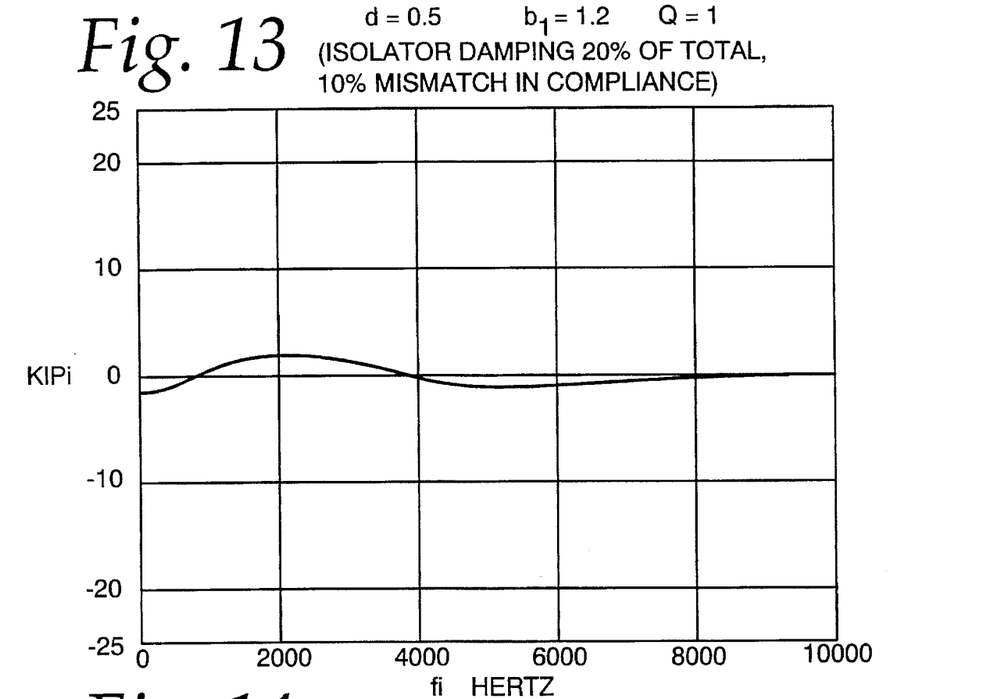
FIG. 13 is a graphical representation of the cross-coupling error coefficient of the accelerometer in accordance with the invention as a function of frequency with a 10% mismatch between the compliances of the pendulum and isolator flexures and the isolator damping at 20% and a mechanical Q of 1.
Figure 14:
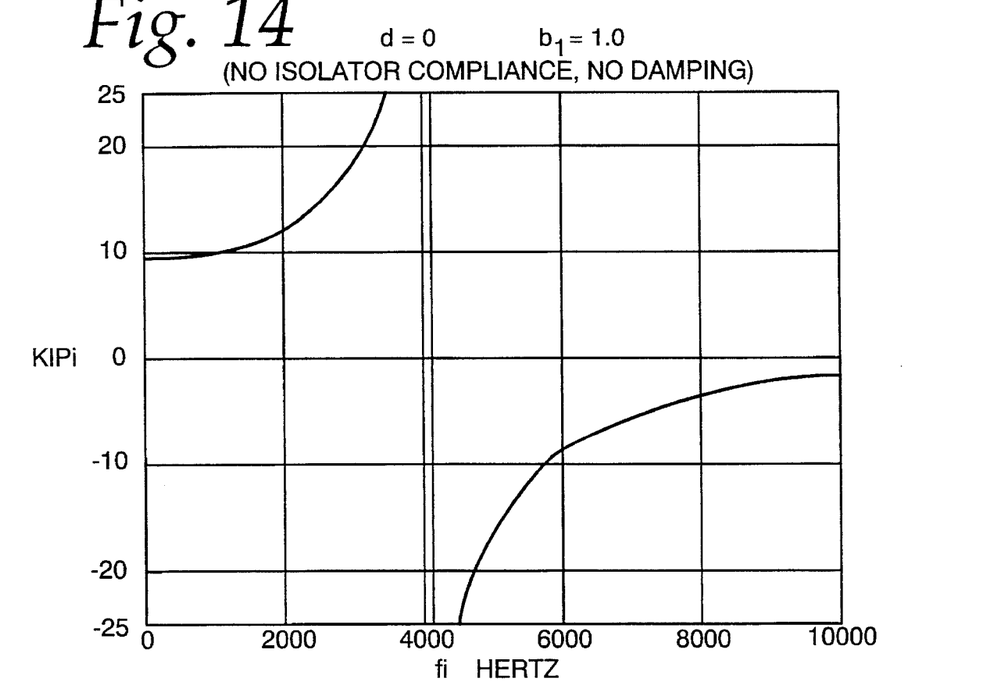
FIG. 14 is a graphical representation of the cross-coupling error coefficient of the accelerometer in accordance with the invention as a function of frequency with no isolator, the base line case without the invention.
Figure 15:
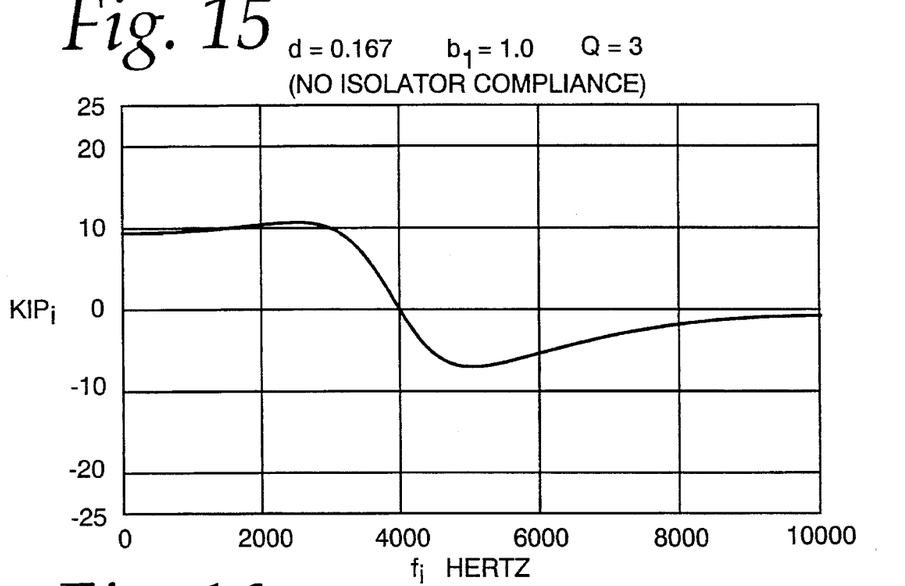
FIG. 15 is a graphical representation of the cross-coupling error coefficient of the accelerometer in accordance with the invention as a function of frequency with no isolator and a mechanical Q of 3, another base line case.

FIGS. 12 and 13 show that combining damping with a 10% compliance mismatch in the isolator flexures 118, 120 and the pendulum flexures 106, 108 does not change the results significantly. FIG. 14 illustrates the overall cross coupling error coefficient $K_{ip}$ with no damping applied while FIG. 15 illustrates the overall $K_{ip}$ coefficient with damping at about ⅙ of the critical level. FIGS. 14 and 15 show that the cross coupling error is significant when the isolator flexures 118, 120 are rigid (i.e., when the invention is not incorporated into the design). For a wide range of damping and reasonable production margins, FIGS. 7–13 show about a 10 to 1 improvement.

Figure 16:
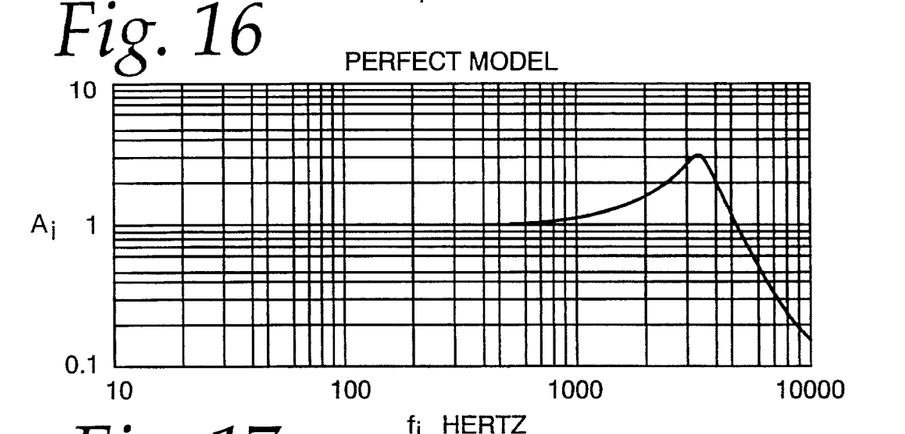
FIG. 16 is a graphical representation of the amplitude response of the accelerometer in accordance with the present invention as a function of frequency where the compliances are perfectly matched.
Figure 17:
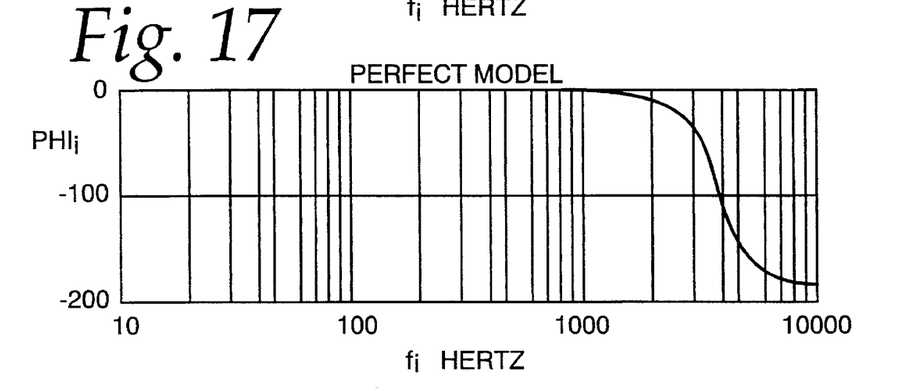
FIG. 17 is a graphical representation of the phase response of the accelerometer in accordance with the present invention as a function of frequency where the compliances are perfectly matched.
Figure 18:
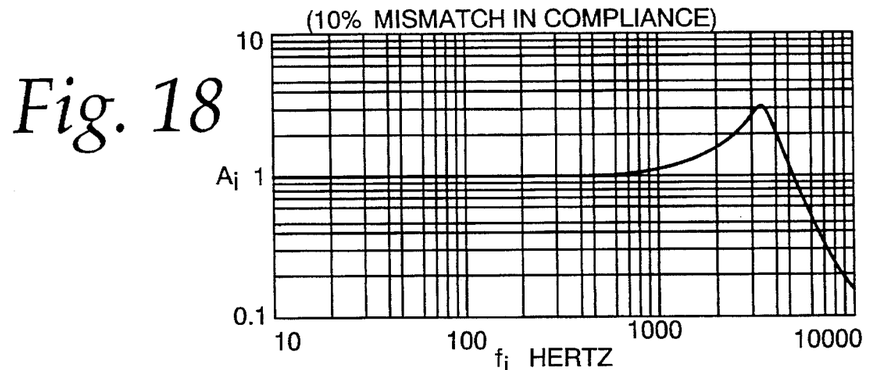
FIG. 18 is a graphical representation of the amplitude response of the accelerometer in accordance with the present invention as a function of frequency except 10% mismatch between the compliances of the pendulum and the isolator.
Figure 19:
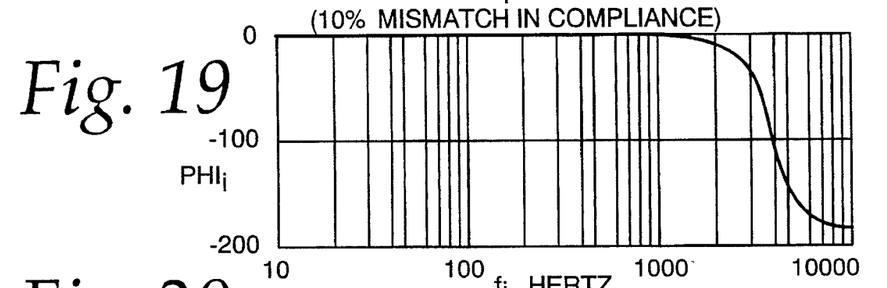
FIG. 19 is a graphical representation of the phase response of the accelerometer in accordance with the present invention as a function of frequency except 10% mismatch between the compliances of the pendulum and the isolator.

FIGS. 16 through 19 illustrate the amplitude and phase response of the accelerometer 100 as a function of the amount of mismatch in the compliances of the pendulum flexures 106, 108 hinges and the isolator flexures 118, 120. In particular, FIGS. 16 and 17 illustrate the case when the compliance of the flexures 106, 108, 118 and 120 is perfectly matched, while FIGS. 18 and 19 illustrate a case when the compliance of the flexures 106, 108, 119, 120 is mismatched by about 10%.

The amplitude response $A_i$ is governed by the following equation 24:

$$A_i = \left[ \frac{N_{1,i} + N_{2,i}}{D_i} \right] * \left[ \frac{\omega_n^2}{Q_4} \right] \quad (24)$$

FIGS. 17 and 19 relate to the phase response $PHI_i$ to the accelerometer 100 over the frequency range 10 to 10,000 Hertz. The equation for determining the frequency response of the accelerometer is provided in equation 25 below:

$$PHI_i = \arg\left[ \frac{N_{1,i} + N_{2,i}}{D_i} \right] * \left[ \frac{180}{\pi} \right] \quad (25)$$

FIGS. 16 through 19 illustrate that the added compliance in the flexures lowers the natural frequency. However, these FIGS. 16–19 also indicate that the response is still basically a second order response even with mismatched compliances.

Compared to the rigid baseline model illustrated in FIGS. 14 and 15, the accelerometer 100 in accordance with the present invention provides several benefits. First, the accelerometer 100 results in lower cross coupling error coefficients than the baseline rigidly mounted accelerometers, for example, as illustrated in U.S. Pat. No. 5,005,413, particularly at lower frequencies (i.e., less than about ½ of the natural frequency). In addition, the performance of the accelerometer 100 is not particularly sensitive to production variables such as damping or compliance mismatch. As a matter of fact, FIGS. 7–9 show that the accelerometer 100 provides acceptable response even without damping except for a relatively narrow band of frequencies near resonance; normally avoided anyway. Other than lowering the natural frequency by about 20%, the accelerometer 100 has no otherwise significant effect on the accelerometers nominal second order response. Additionally, the isolator flexures 118, 120 which provide the improved response add virtually nothing to the production costs and additionally provide improved isolation of the pendulum 102 from the mounting base 110 due to the reduced cross section of the isolator flexures 118, 120, as discussed in detail in U.S. Pat. No. 5,005,413, and additionally reduces the cross coupling error.

Figure 20:
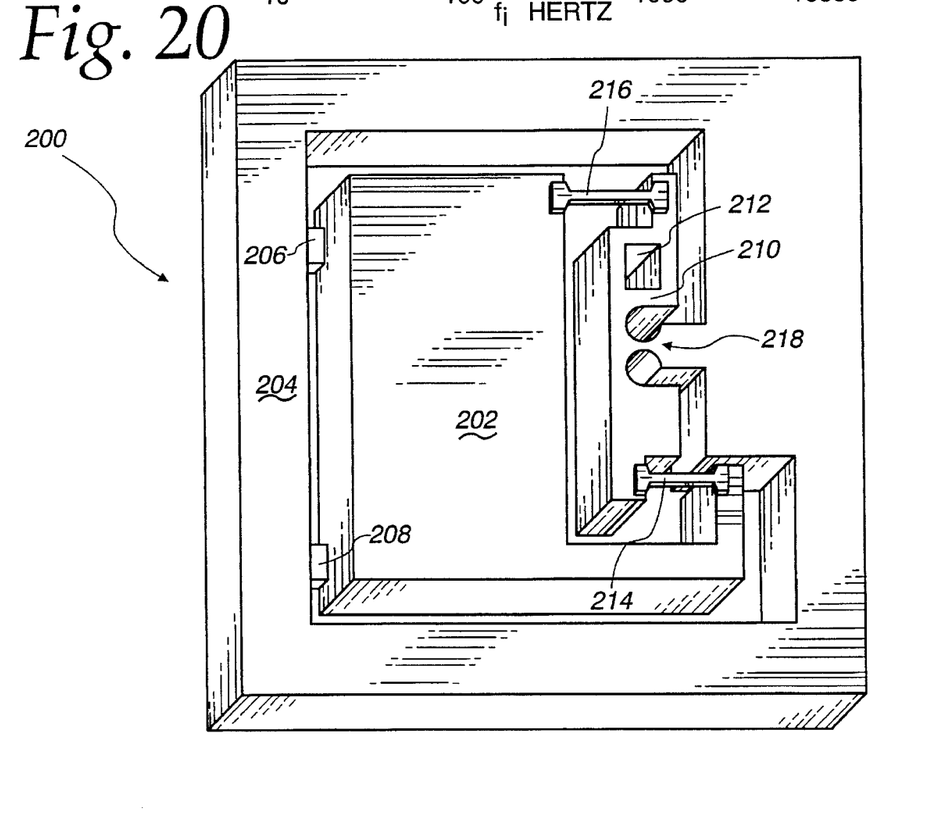
FIG. 20 is an alternative embodiment of an accelerometer in accordance with the present invention.

An alternative embodiment of the invention is illustrated in FIG. 20. In this embodiment, the accelerometer, generally identified with the reference numeral 200, includes a proof mass or pendulum 202, rotatably connected to a mounting base 204 by way of a pair of flexures 206 and 208, which define a hinge axis HA. The flexures 206 and 208 enable the pendulum 202 to rotate relative to the mounting base 204. A thermal isolator 210 is formed between the free end of the pendulum 202 and the mounting base 204. In order to constrain movement of the pendulum 202, the pendulum 202 is attached to the isolator 210 by way of a pair of resonators 214 and 216.

The isolator 210 is formed with a generally rectangular slot 212 and a flexure 218. The flexure 218 makes the isolator 210 compliant for rotation about a vertical axis, generally perpendicular to the plane of the page but relatively stiff in all translational modes. The rectangular slot 212 causes the isolator 210 to be heavier on the opposing side so that acceleration applied along the input axis $A_I$ creates a torque about the isolator flexure 218, which puts both of the resonators 214 and 216 into tension or compression at the same time. The force sensitive resonators used in these accelerometers are known to have significantly nonlinear transfer functions, characterized especially by a well-defined square law effect. If the accelerometer of FIG. 20 is accelerated simultaneously along its input and pendulous axes with accelerations $a_I$ and $a_P$, respectively, the two resonators will have indicated accelerations as illustrated in equations (26) and (27) as follows:

$$a_{ind}216 = a_I + K_P a_P + K_{II}(a_I + K_P a_P)^2 \quad (26)$$

$$a_{ind}214 = -a_I + K_P a_P + K_{II}(-a_I + K_P a_P)^2 \quad (27)$$

If the output signals are processed by simply subtracting and dividing by 2, equation 28 results:

$$a_{ind} = a_I + 2K_{II} K_P a_I a_P \quad (28)$$

Here $K_{II}$ is the square law coefficient of the resonators, and $K_P$ is a constant determined by the mass imbalance of the isolator 210. The quantity $2K_{II}K_P$ has the same form as $K_{ip}$ and it may be adjusted by varying $K_P$ to have any desired magnitude and polarity. Such a configuration results in a pseudo $K_{ip}$ which can be forced to cancel the cross axis cross coupling error.

The accelerometers 100 and 200 may be formed as silicon micromachined devices. Details for fabricating such devices are disclosed in U.S. Pat. No. 5,005,413 and 5,287,744, hereby incorporated by reference.

It should be understood that although particular embodiments of the invention have been shown and illustrated, it is to be understood that the present invention is not intended to be so limited. As will be appreciated by those of ordinary skill in the art, the spirit and scope of the appended claims are intended to cover various embodiments, all considered to be within the broad scope of the invention.

What is claimed and desired to be secured by a Letters Patent in the United States is:

1. An accelerometer for sensing acceleration along an input axis comprising:

a mounting base;

a pendulum;

an isolator coupled to said mounting base and said pendulum, said mounting base, said pendulum and said isolator defining a common plane;

one or more flexures for rotatably mounting said pendulum relative to said isolator about a predetermined axis;

means for constraining the movement of said pendulum, said constraining means coupled between said pendulum and said isolator and including a plurality of resonators formed in the common plane adjacent a top side of said accelerometer; and at least one isolator flexure for rotatably coupling said mounting base and said isolator, said isolator flexure disposed adjacent a bottom side of said accelerometer, wherein the stiffness of said isolator flexure is selected to reduce cross-coupling errors in the output signal of the accelerometer.

2. An accelerometer as recited in claim 1, wherein said constraining means includes one or more double-ended tuning forks (DETFs).

3. An accelerometer as recited in claim 1, wherein said rotatably mounting means includes a pair of flexures.

4. An accelerometer as recited in claim 1, wherein said reducing means includes means for reducing mounting stresses transmitted to said pendulum from said mounting base.

5. An accelerometer as recited in claim 1, wherein said rotatably mounting means includes a pair of pendulum flexures with a first predetermined degree of compliance and said reducing means includes a pair of isolator flexures for rotatably coupling said isolator to said mounting base, said isolator flexures having a second predetermined degree of compliance.

6. An accelerometer as recited in claim 5, wherein said first predetermined degree of compliance is not equal to said second predetermined degree of compliance.

7. An accelerometer as recited in claim 1, wherein said isolator is formed by way of a slot between a portion of the pendulum and the mounting base.

8. An accelerometer as recited in claim 1, wherein said isolator includes a flexure for enabling said isolator to rotate about an axis generally perpendicular to its plane.

9. An accelerometer as recited in claim 8, wherein said isolator includes means for causing said isolator to rotate about its axis in response to an acceleration.

10. An accelerometer for sensing acceleration along an input axis comprising:

a mounting base;

a pendulum;

an isolator coupled to said mounting base and said pendulum;

one or more flexures rotatably mounting said pendulum relative to said isolator about a predetermined axis;

one or more resonators coupled between said pendulum and said isolator in order to constrain movement of said pendulum; and one or more isolator flexures for rotatably coupling said mounting base and said isolator, the stiffness of said isolator flexure selected to reduce cross-coupling errors in the output of said accelerometer.

* * * * *